United States Patent [19]

Akimoto et al.

[11] Patent Number: 5,862,420
[45] Date of Patent: Jan. 19, 1999

[54] CONTROL DEVICE FOR A CAMERA SHUTTER AND A CONTROL METHOD THEREFOR

[75] Inventors: Kazuo Akimoto; Seiichi Imano, both of Yotsukaido, Japan

[73] Assignee: Seiko Precision Inc., Japan

[21] Appl. No.: 936,652

[22] Filed: Sep. 24, 1997

[30] Foreign Application Priority Data

Sep. 25, 1996 [JP] Japan .................................. 8-252835

[51] Int. Cl.⁶ .................................................. G03B 7/093
[52] U.S. Cl. ......................................... 396/236; 396/245
[58] Field of Search ................................. 396/236, 245, 396/240

[56] References Cited

U.S. PATENT DOCUMENTS 5,255,049 10/1993 Akimoto et al. ........................ 396/236
5,745,808 4/1998 Tintera .................................... 396/236

*Primary Examiner*—W. B. Perkey
*Attorney, Agent, or Firm*—Adams & Wilks

[57] ABSTRACT

A control device for a camera shutter comprises a diaphragm value setting device for setting a predetermined diaphragm value of the shutter, an exposure value setting device for setting an exposure value of the shutter, a storing device for storing an opening size of the shutter, output timings of signals for controlling opening and closing operations of the shutter, and an exposure value of the shutter corresponding to the set diaphragm value, and a control apparatus for controlling the opening and closing operations of the shutter on the basis of output signals from the diaphragm value setting device, the exposure value setting device and the storing device. The control apparatus calculates the output timings of the signals for controlling the opening and closing operations of the shutter on the basis of the exposure value of the shutter outputted from the exposure value setting device, and controls the opening and closing operations of the shutter on the basis of the results of the calculation.

11 Claims, 3 Drawing Sheets

| diaphragm setting | AV | timing Ts | EV |
|---|---|---|---|
| F2.8 | 3.0 | 4ms | 11.0 |
| F4.0 | 4.1 | 4ms | 12.5 |
| ⋮ | ⋮ | ⋮ | ⋮ |
| F16 | 7.9 | 4ms | 16.5 |

CONTROL DEVICE FOR A CAMERA SHUTTER AND A CONTROL METHOD THEREFOR

BACKGROUND OF THE INVENTION

1. Field of the Invention

The present invention relates generally to a control device for a camera shutter and a control method therefor and, more particularly, to a control device and method for controlling the opening time of a shutter for a camera in an aperture-priority mode.

2. Description of Related Art

An exposure value (Ev) of a camera is a function of a diaphragm value of the shutter and the opening time therefor. Therefore, the opening time of the shutter is determined by setting a predetermined exposure value and the diaphragm value.

An operation of driving a shutter is schematically shown in FIG. 5 wherein the abscissa and ordinate represent the time (t) and opening size (Av), respectively. In FIG. 5, the shutter starts its opening motion at a point A, is fully opened at a point B, starts its closing motion at a point C after an opening time (t) elapses, and then is completely closed at a point D. The resulting waveform comprises inclined linear segments AB and CD and a horizontal linear segment BC to define, with the abscissa, a trapezoid configuration. The area of the trapezoid which is enclosed by the points A, B, C and D corresponds to the exposure value (Ev) for this shutter driving operation. The shutter driving operation which provides such a trapezoidal waveform for the opening and closing operations of the shutter is referred to as a "trapezoidal control". Thus, when the diaphragm value is changed, a time period for holding a predetermined opening size must be changed to obtain the same exposure value. That is, when the opening size is changed from a certain value (Av) to a value (Av') smaller than the value (Av), the opening period of time is changed to AD' and an area of a trapezoid surrounded by AB'C'D'A becomes the corresponding exposure value.

In the above-described exposure operation, the opening and closing operations of the shutter denoted by the inclined linear segments AB and CD in FIG. 5 are controlled by a stepping motor in a stepwise manner. Since a time difference exists between the rotation of the stepping motor and the operation of shutter vanes, the above-described waveform becomes a distorted trapezoid.

In a conventional method for controlling the opening time of the shutter in which the exposure amount is controlled by a stepping motor, etc., the relationship between the exposure value (Ev) and the opening time (t) at each of predetermined diaphragm values is stored beforehand as a data table in a storing unit of a control device, and the opening time for a desired shutter driving operation is determined on the basis of the data table.

When the trapezoidal control is carried out in the aperture-priority mode, the opening time is varied in accordance with the diaphragm value. For example, if the diaphragm value is set at a value smaller than the value for the full-opened diaphragm, the opening time must be set to be longer to obtain the same exposure value as set for the diaphragm full-opening operation. Therefore, in order to control the opening time with the data table, a data table must be individually prepared for each and every exposure value in order to cover all diaphragm values, and thus the number of the data tables is greatly increased.

In Japanese Unexamined Patent Publication No. JP-A-4-319924, applicants have proposed the following in an effort to resolve the above-described drawbacks in the conventional art. That is, in controlling the opening and closing operations of a shutter and the opening time based on the set exposure value of a camera, the set diaphragm values of a shutter and the like, the opening time for a set diaphragm value is calculated and determined based on the opening size at a predetermined diaphragm value of the shutter, and thus the amount of data stored in the data tables is reduced.

Although the capacity of the storing unit of the control device could be reduced by the above proposal, the opening time of the shutter and the like in accordance with the opening size at each of various diaphragm values, the time periods required for the shutter opening and closing operations, and the exposure value in accordance with the brightness of an object or the like are also required to be stored in the storing unit, and calculations are carried out based on such data. Furthermore, data pertaining to the exposure value must be stored in fine steps in order to perform a highly fine exposure value control. Thus the amount of data required to be stored in the storing unit of the control device is greatly increased, and the points of adjustment in the control device become numerous, thereby requiring a long period of time for processing the adjustment and for conducting the overall exposure operation.

SUMMARY OF THE INVENTION

In view of the foregoing drawbacks in the conventional art, it is an object of the present invention to provide an improved control device for a camera shutter and a control method therefor in which various program controls can be easily carried out using a small amount of data memory.

Another object of the present invention is to provide a control device for a camera shutter and control method therefor which improves the processing speed and accuracy of an exposure operation.

In order to meet the above-described and other objects, the control device for a shutter according to the present invention comprises diaphragm value setting means for setting a predetermined diaphragm value of the shutter, exposure value setting means for setting an exposure value of the shutter detected by the camera, memory means for storing data for controlling the shutter, and control means for controlling opening and closing operations of the shutter on the basis of output signals from the diaphragm value setting means, the exposure value setting means, and the memory means.

Preferably, the memory means stores data setting an opening size of the shutter, output timings of signals for controlling the opening and closing operations of the shutter, and the exposure value for each of the diaphragm values which can be set in a stepwise manner.

Preferably, the control means controls the opening and closing operations of the shutter by receiving the output signals from the above-described respective means and calculating the output timings of the signals for controlling the opening and closing operations of the shutter in accordance to the exposure value outputted from the exposure value setting means.

By the foregoing construction of the control device for a camera shutter and control method therefor according to the present invention, the opening time of the shutter is controlled by storing an opening size, a shutter timing and an exposure value corresponding to a diaphragm value in the memory means of the control device, and performing a calculation using the stored shutter timing corresponding to the exposure value detected by the camera. The data to be stored in the memory means is only data for each of the diaphragm values that can be set and, therefore, the amount of data to be stored in the memory means of the control device can be reduced even when high accuracy exposure value control is carried out.

BRIEF DESCRIPTION OF THE DRAWINGS

FIG. 3(a) shows output timings of a magnet drive signal and FIG. 3(b) shows the control of an exposure value by a trapezoidal control;

FIG. 4(a) shows output timings of the magnet drive signal and FIG. 4(b) shows the control of the exposure value by a trapezoidal control.

DETAILED DESCRIPTION OF THE PREFERRED EMBODIMENT

An embodiment of the control device for a camera shutter according to the present invention will be described hereunder with reference to the accompanying FIGS. 1–4.

Figures 1, 2:
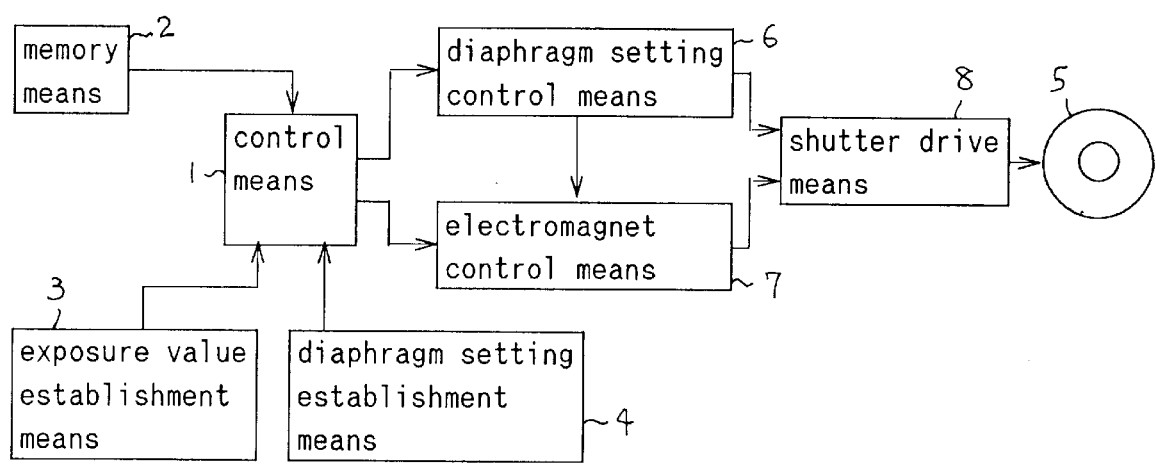
FIG. 1 shows a data table used in an embodiment of the control device for a camera shutter according to the present invention.
FIG. 2 is a block diagram of the control device for a camera shutter according to an embodiment of the present invention.

As shown in FIG. 2, the control device for a camera shutter according to the present invention comprises control means 1 which inputs data from storing or memory means 2, exposure value setting means 3 and diaphragm value setting means 4. The control means 1 controls a shutter 5 by controlling diaphragm value control means 6 to control an opening size of the shutter 5 and by controlling electromagnet control means 7 to control timings for opening and closing the shutter. Output signals from the diaphragm value control means 6 and the electromagnet control means 7 are respectively outputted to shutter drive means 8 which drives the shutter 5 to opened and closed positions by means of the output signals.

The control means 1 comprises a CPU, microprocessor or the like and performs prescribed calculations on the basis of output signals from the memory means 2, the exposure value setting means 3 and the diaphragm value setting 4, determines output timings of signals for controlling an amount of rotation of the motor, the opening period of time of the shutter and the opening and closing operations of the shutter at the diaphragm value and the exposure value which have been set, and outputs control signals corresponding thereto respectively to the diaphragm value control means 6 and the electromagnet control means 7.

A non-volatile memory such as, for example, an EEPROM is preferably used for the memory means 2 where, as shown in FIG. 1, data required for the calculation, such as the opening size (Av), the output timing data (Ts) of the control signal of the shutter, and the exposure values (Ev) corresponding to the diaphragm value (F) are stored in a data table beforehand.

The exposure value setting means 3 is provided with detecting means for detecting various information such as brightness of an object, film sensitivity, and exposure correction, etc., and outputs a signal representing an exposure value to the control means 1 through calculation of the exposure value or a manual setting.

The diaphragm value setting means 4 sets a diaphragm value through a manual setting, such as by a photographer, or detects various conditions to automatically set the diaphragm value, such as by means of various sensors installed in the camera, and outputs a signal representing the diaphragm value to the control means 1.

The shutter drive means 8 preferably comprises a motor, such as a stepping motor, and a motor driver and controls the shutter 5 by receiving output signals from the diaphragm value control means 6 and the electromagnet control means 7. The shutter 5 serves as a diaphragm and includes opening shutter vanes or sectors for opening the shutter and closing shutter vanes or sectors for closing the shutter. The opening and closing of the shutter vanes are carried out by rotational motion of the motor of the shutter drive means 8, where the shutter is opened by the opening shutter vanes when current flow to an opening electromagnet is interrupted, and the shutter is closed by the closing shutter vanes when current flow to a closing electromagnet is interrupted.

The diaphragm value control means 6 controls the diaphragm value based on a signal corresponding to a set diaphragm value outputted by the control means 1. The electromagnet control means 7 controls operational timings of the opening shutter vanes and the closing shutter vanes based on an exposure value signal outputted by the control means 1.

Figure 3A:
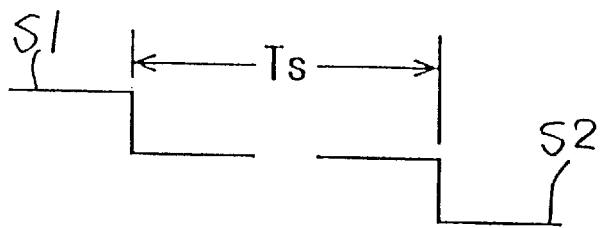
FIGS. 3(a) and 3(b) are diagrams showing the basic operational state of a shutter, where
Figure 3B:
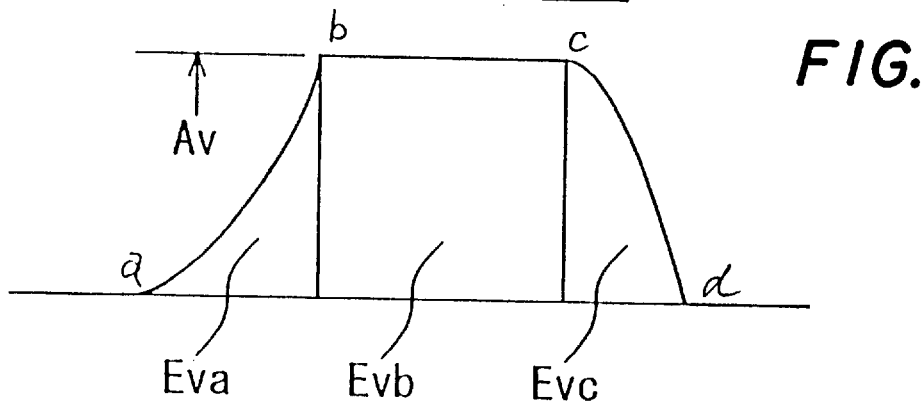

FIGS. 3(a) and 3(b) illustrate the basic form of the trapezoidal control of the shutter in the aperture-priority mode. FIG. 3(a) shows an electromagnet control signal of an electromagnet for opening the shutter and an electromagnet control signal of an electromagnet for closing the shutter. FIG. 3(b) shows a relationship between time (t) and an opening size (Av) at a predetermined diaphragm value.

When signals in accordance with the exposure value and the set diaphragm value are outputted from the control means 1 to the diaphragm value control means 6 and the electromagnet control means 7, the diaphragm value control means and the electromagnet control means drive the shutter drive means 8 to set the diaphragm value setting means to a predetermined diaphragm value, close the closing shutter vanes to establish the opening size (Av) and, thereafter, open the opening shutter vanes by operating the opening electromagnet (S1). Even if the opening shutter vanes are fully opened, the closing shutter vanes are set to the predetermined opening size (Av) and, accordingly, the opening size is maintained as it is. Thereafter, when a time period (Ts) corresponding to the exposure value has elapsed, the electromagnet for closing the shutter is operated by an output of the electromagnet control signal from the control means 1, whereby the closing shutter vanes are closed (S2). Time points of outputting the electromagnet control signals of both electromagnets are the output timings for controlling the shutter, and an interval between both timings corresponds to the time period (Ts). The photographing operation is finished by completely closing the closing shutter vanes and the shutter vanes return to initial positions, whereby the operation is finished. In FIG. 3(b), an area surrounded by a curve abcda corresponds to the exposure value (Ev), and the exposure value (Ev) is a sum of an exposure value (Eva) corresponding to the opening time, an exposure value (Evb) corresponding to a time period where the predetermined opening size stays constant, and an exposure value (Evc) corresponding to the closing time.

Assuming that a photographer sets the diaphragm value as F4.0, then Av=4.1, ts=4 ms, and Ev=12.5 are outputted to the control means 1. This set of data is shown in the data table of FIG. 1, where the opening size (Av), the timing (Ts) and the exposure value (Ev) are stored in the memory means 2. When an exposure value (Ev') outputted from the exposure value establishment means 3 is equal to the stored exposure value data (Ev) (i.e., Ev'=Ev), the control means 1 does not need to execute any calculation, and the exposure value setting means 3 outputs the stored data to the control means of the shutter 5 as the control signals by which the shutter 5 is opened and closed.

Figure 4A:
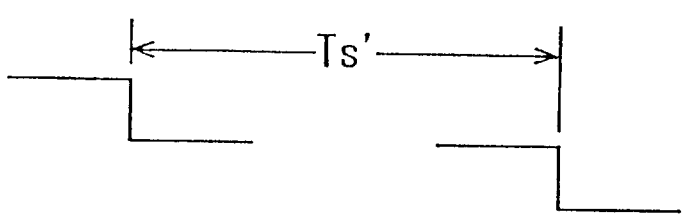
FIGS. 4(a) and 4(b) are diagrams showing the operational state of a shutter that is modified by a change in the exposure value, where
Figure 4B:
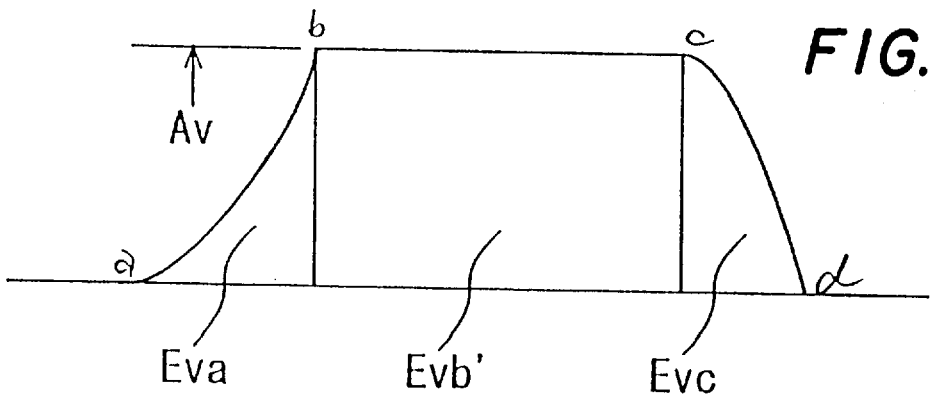
Figure 5:
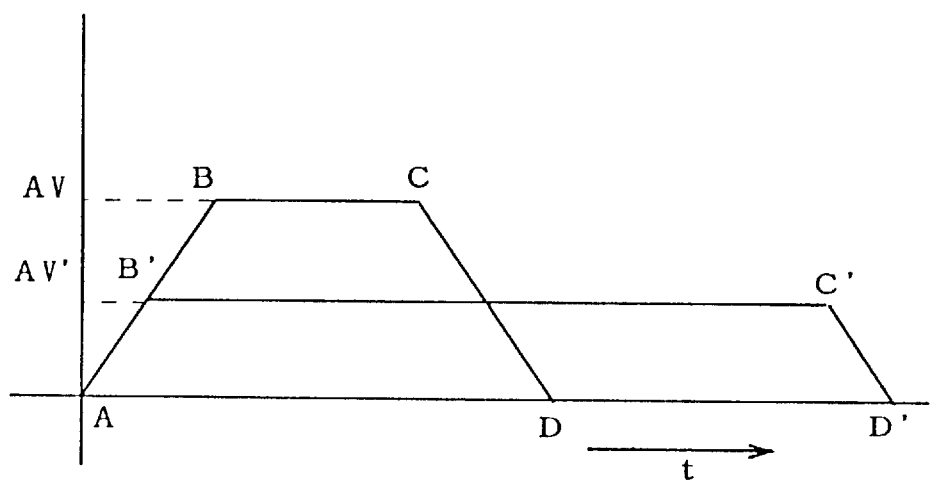
FIG. 5 illustrates diagrams each showing a relationship between time and an opening size of the shutter obtained by a trapezoidal control.

However, it is actually rare that Ev'=Ev and normally it is ordinary that Ev'≠Ev. For example, when Ev'=13.0 with the diaphragm value of F 4.0, since the opening size remains unchanged, no change is caused in Eva and Evc in FIG. 3(b) and only the exposure value Evb corresponding to the opening period of time is enlarged. For that purpose, as shown by FIGS. 4(a) and 4(b), in order to establish the exposure value (Ev') enlarging the timing (Ts) corresponding to Evb, the problem can be dealt with by an operation where a timing (Ts') having a length necessary for establishing the exposure value (Ev') is set.

The timing Ts' is outputted after having been calculated by the control means 1. The calculation is executed by the following equation that is derived as a function of Ev', Ev and Av.

$$TS' = \frac{1000}{2^{(Ev'-Av)}} - \frac{1000}{2^{(Ev-Av)}} + TS$$

By this method, control of the shutter can be carried out for each and every exposure value with respect to a certain diaphragm value by the data pertaining only to an opening size (Av), an output timing (Ts) of the control signal, and an exposure value (Ev).

With respect to the timing (Ts), it is conceivable that in some cases the value remains constant as shown in the data table of FIG. 1, and that in other cases an optimum numerical value is set from the relation with the opening size (Av). However, it is preferable that the timing (Ts) remain constant in order to reduce the amount of data to be stored. Furthermore, the exposure value (Ev) displayed in the data table is a numerical value determined as a function of the opening size (Av) and the electromagnet control timing (Ts) and, accordingly, if these values differ, the exposure value is naturally provided with a different numerical value.

According to the present invention, a data table containing opening sizes and output timings of an electromagnet control signal with a reference of diaphragm values having a small number of reference points are stored in memory means of the control device, and the output timings of the electromagnet control signals of a shutter are calculated in accordance with changes in the exposure value and, therefore, the amount of data stored in the memory means can be greatly reduced. Thus, memory means having a small capacity can be used, and the processing speed of an exposure operation is improved due to a reduction in the points of adjustment required in the control device.

We claim:

1. A control device for a camera shutter, the control device comprising:
    diaphragm value setting means for setting a predetermined diaphragm value of the shutter;
    exposure value setting means for setting an exposure value of the shutter;
    storing means for storing an opening size of the shutter, output timings of signals for controlling opening and closing operations of the shutter, and an exposure value of the shutter corresponding to the diaphragm value of the shutter; and
    control means for controlling the opening and closing operations of the shutter on the basis of output signals from the diaphragm value setting means, exposure value setting means and the storing means.

2. A control device for a camera shutter according to claim 1; wherein the control means includes calculating means for calculating the output timings of the signals for controlling the opening and closing operations of the shutter on the basis of the exposure value outputted from the exposure value setting means, the control means controlling the opening and closing operations of the shutter on the basis of the results of the calculation by the calculating means.

3. A control device for a camera shutter according to claim 2; wherein the exposure value setting means sets the exposure value of the shutter on the basis of detection data from the camera.

4. A control device for a camera shutter according to claim 2; wherein the control means includes means for setting the diaphragm values in a stepwise manner.

5. A control device for a camera shutter according to claim 4; wherein the means for setting the diaphragm values in a stepwise manner comprises a stepping motor.

6. A control device for a camera shutter according to claim 1; wherein the exposure value setting means sets the exposure value of the shutter on the basis of detection data from the camera.

7. A control device for a camera shutter, the control device comprising:
    diaphragm value setting means for setting a predetermined diaphragm value of the shutter;
    means for controlling the set diaphragm value of the shutter in a stepwise manner;
    exposure value setting means for setting an exposure value of the shutter;
    storing means for storing an opening size of the shutter, output timings of signals for controlling opening and closing operations of the shutter, and an exposure value of the shutter corresponding to the diaphragm value set in a stepwise manner; and
    control means for calculating the output timings of the signals for controlling the opening and closing operations of the shutter on the basis of the exposure value of the shutter outputted from the exposure value setting means, and controlling the opening and closing operations of the shutter on the basis of the results of the calculation.

8. A control device for a camera shutter according to claim 7; wherein the drive means comprises a stepping motor.

9. A control device for a camera shutter according to claim 7; wherein the exposure value setting means sets the exposure value of the shutter on the basis of detection data from the camera.

10. A method for controlling the opening and closing operations for a camera shutter, comprising the steps of:
    setting a predetermined diaphragm value of the shutter;
    setting an exposure value of the shutter;
    storing an opening size of the shutter, output timings of signals for controlling opening and closing operations of the shutter, and an exposure value of the shutter corresponding to the set diaphragm value;
    calculating the output timings of the signals for controlling the opening and closing operations of the shutter on the basis of the exposure value of the shutter; and controlling the opening and closing operations of the shutter on the basis of the results of the calculation.

11. A method for controlling the opening and closing operations for a camera shutter according to claim 10; wherein the step of setting the diaphragm value of the shutter comprises setting the diaphragm value in a stepwise manner.

* * * * *